(12) United States Patent
Jain et al.

(10) Patent No.: US 9,646,014 B1
(45) Date of Patent: May 9, 2017

(54) SYSTEMS AND METHODS FOR SELECTIVE DEFRAGMENTATION

(75) Inventors: Sanjay Jain, Pune (IN); Anindya Banerjee, Pune (IN); Kedar Patwardhan, Pune (IN)

(73) Assignee: Veritas Technologies, Mountain View, CA (US)

( * ) Notice: Subject to any disclaimer, the term of this patent is extended or adjusted under 35 U.S.C. 154(b) by 1217 days.

(21) Appl. No.: 12/550,259

(22) Filed: Aug. 28, 2009

(51) Int. Cl.
*G06F 17/30* (2006.01)
(52) U.S. Cl.
CPC .............. *G06F 17/30135* (2013.01)
(58) Field of Classification Search
CPC ................................ G06F 17/30135
USPC ...................................................... 707/693
See application file for complete search history.

(56) References Cited

U.S. PATENT DOCUMENTS

| 7,124,272 B1 * | 10/2006 | Kennedy et al. ........... 711/173 |
| 2002/0116573 A1 * | 8/2002 | Gold ........................... 711/111 |
| 2005/0165856 A1 * | 7/2005 | Fellenstein et al. ......... 707/200 |
| 2007/0027940 A1 * | 2/2007 | Lutz et al. ................... 707/205 |
| 2008/0313639 A1 * | 12/2008 | Kumar et al. ............... 718/104 |
| 2009/0327370 A1 * | 12/2009 | Schmidt ...................... 707/205 |

OTHER PUBLICATIONS

Wendt, Jerome; "Granularity of Control and Hypervisor Communication Becoming the Prerequisites for Virtual Machine File System Defragmentation;" DCIG; Dec. 4, 2008. http://www.dciginc.com/2008/12/granularity-of-control-and-hypervisor-communi.html.

\* cited by examiner

*Primary Examiner* — Grace Park
(74) *Attorney, Agent, or Firm* — FisherBroyles LLP (57) ABSTRACT

Various computer-implemented methods for selective defragmentation are disclosed. In one example, an exemplary method for performing such a task may include: 1) identifying a file system, 2) tracking changes to files in the file system, 3) creating a list of changed files, and then 4) selectively defragmenting files in the list of changed files. Various other methods, systems, and computer-readable media are also disclosed.

18 Claims, 7 Drawing Sheets

SYSTEMS AND METHODS FOR SELECTIVE DEFRAGMENTATION

BACKGROUND

Data storage devices have long been a major bottleneck in computer performance. Computer programs attempting to read from or write to a storage device frequently stall while waiting for a response from the storage device. This may result in an inefficient computing system with slow or unresponsive applications.

Many storage devices offer substantially better performance when data is accessed sequentially (i.e., accessing physically adjacent units of storage) rather than randomly (i.e., accessing units of storage with arbitrary relative positions). Defragmentation programs help to take advantage of this superior sequential-access performance by defragmenting files in a file system such that each file is stored sequentially on the storage device.

Unfortunately, given the relatively slow performance of storage devices, defragmentation processes may take an unacceptably long period of time to complete. Furthermore, file systems tend to fragment files over time, requiring periodic defragmentation in order to maintain optimal levels of performance.

In an attempt to address these problems, some defragmentation programs may reduce the time required to defragment a volume by allowing a user to select only certain files for defragmentation, as opposed to simply defragmenting all files present on the volume. However, this may require the user to invest a substantial amount of time selecting those files that should be defragmented, and may result in many files remaining fragmented.

SUMMARY

As will be described in greater detail below, the instant disclosure generally relates to systems and methods for selective defragmentation. Embodiments of the instant disclosure may improve the efficiency and effectiveness of conventional defragmentation operations by tracking which files in a file system have changed and then only defragmenting these changed files. In one example, the various systems disclosed herein may accomplish this task by: 1) identifying a file system, 2) tracking changes to files in the file system, 3) creating a list of changed files, and then 4) selectively defragmenting files in the list of changed files.

In some examples, tracking changes to files in the file system may include tracking changes to files in the file system over a predetermined interval of time. In addition, the various systems disclosed herein may track changes to files in the file system in a variety of ways, including, for example, by tracking the modification of a file, tracking the creation of a file, tracking the modification of a directory, tracking the creation of a directory, and/or tracking movement of a file or directory from one volume to another in a multi-volume file system.

In some embodiments, creating the list of changed files may include: 1) identifying a file change log (which may, e.g., identify changes to files in the file system), 2) parsing the file change log for at least one filename of a changed file, and then 3) adding the filename(s) to the list of changed files. In some embodiments, the method may also include fully defragmenting the file system before selectively defragmenting the file system.

In some examples, selectively defragmenting the files in the list of changed files may include defragmenting only the files in the list of changed files. In some examples, selectively defragmenting the files in the list of changed files may include compacting free space in the file system based on the list of changed files.

In some embodiments, the method may further include: 1) tracking file-system activity, 2) creating a log of file-system activity, and 3) selectively defragmenting files in the file system based on the log of file-system activity. In these embodiments, tracking file-system activity may include: 1) tracking the input/output statistics of a file, 2) tracking the opening of a file, and/or 3) tracking access of a file. Furthermore, selectively defragmenting files in the file system based on the log of file-system activity may include aggressively defragmenting files with a high level of file-system activity.

As will be explained below, by tracking which files in a file system have changed, the systems and methods described herein may identify and defragment only those files that may be fragmented, potentially saving time for an end-user as well as computing resources while ensuring that most or all fragmented files in the file system are defragmented. In addition, and as will be discussed below, some embodiments described herein may further conserve time and computing resources by tracking other indicia of file-system activity and selectively defragmenting files based on such information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for selective defragmentation. In one example, the various systems disclosed herein may accomplish this task by: 1) identifying a file system, 2) tracking changes to files in the file system, 3) creating a list of changed files, and then 4) selectively defragmenting files in the list of changed files.

As will be explained below, by tracking which files in a file system have changed, the systems and methods described herein may identify and defragment only those files that may be fragmented, potentially saving time for an end-user as well as computing resources while ensuring that most or all fragmented files in the file system are defragmented. In addition, and as will be discussed below, some embodiments described herein may further conserve time and computing resources by tracking other indicia of file-system activity and selectively defragmenting files based on such information.

Figure 1:
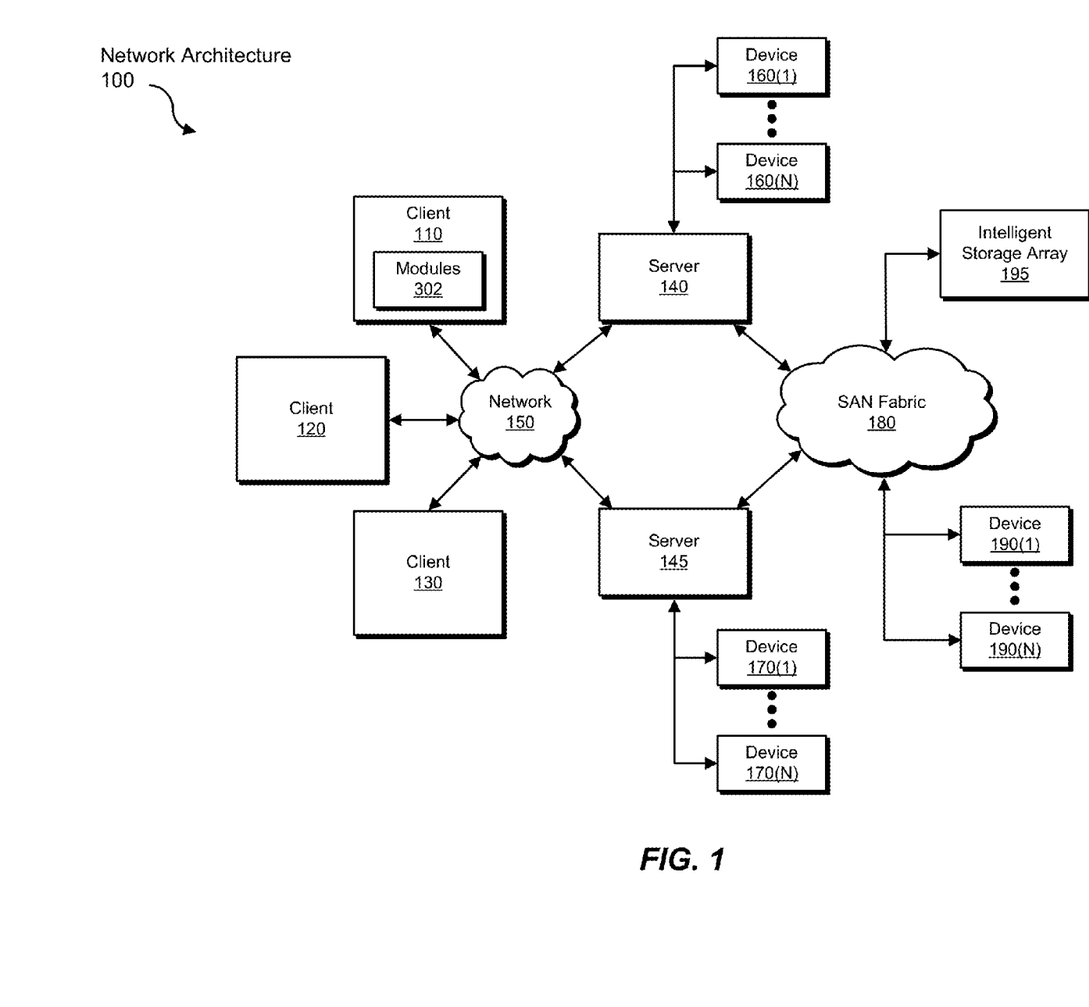
FIG. 1 is a block diagram of an exemplary computing network capable of implementing one or more of the embodiments described and/or illustrated herein.
Figure 2:
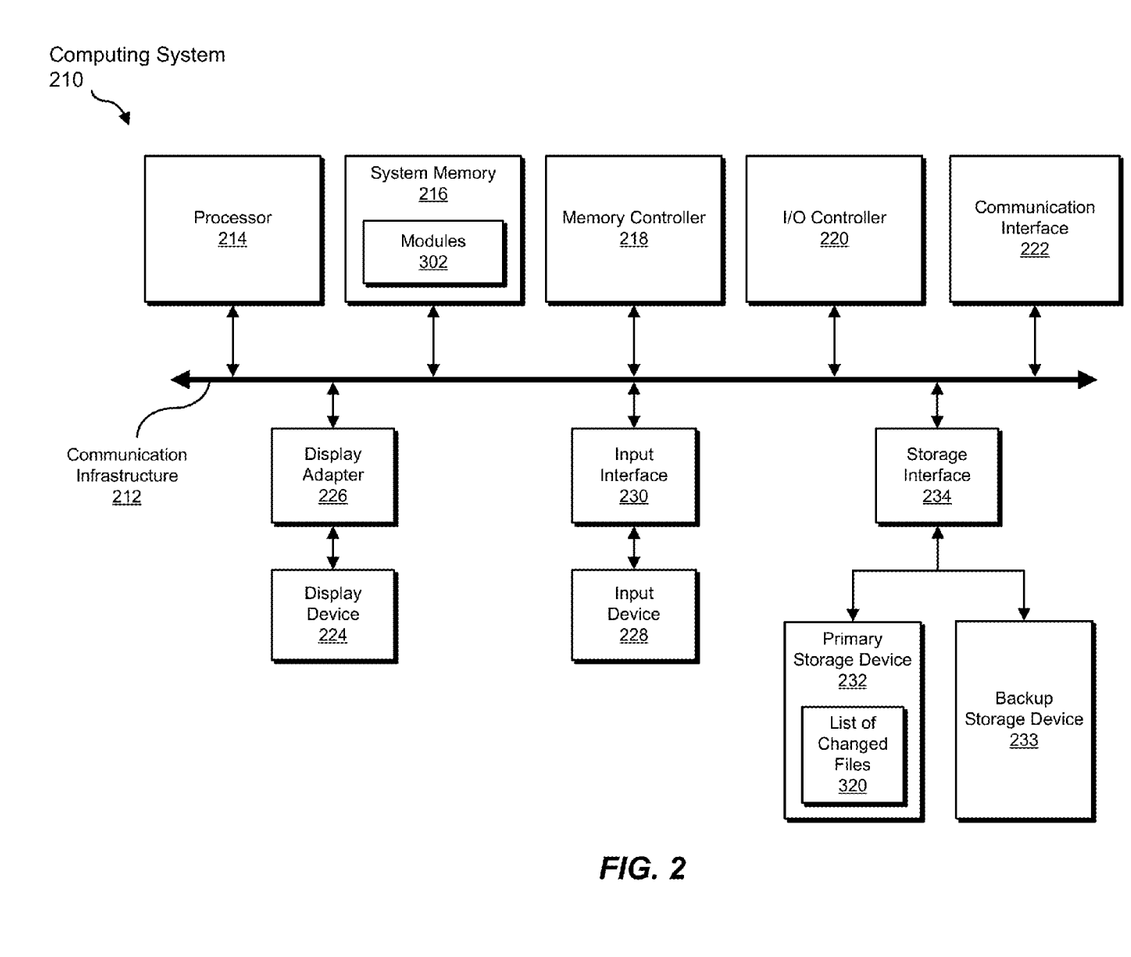
FIG. 2 is a block diagram of an exemplary computing system capable of implementing one or more of the embodiments described and/or illustrated herein.

The following will provide, with reference to FIGS. 1 and 2, detailed descriptions of an exemplary network architecture and computing system capable of implementing one or more of the embodiments described herein. Detailed descriptions of exemplary systems for selective defragmentation will also be provided in connection with FIGS. 3-4. In addition, detailed descriptions of corresponding computer-implemented methods will be provided in connection with FIGS. 5-6, with FIG. 7 providing, for illustrative purposes, exemplary arrangements of files stored on a disk.

FIG. 1 is a block diagram of an exemplary network architecture 100 in which client systems 110, 120, and 130 and servers 140 and 145 may be coupled to a network 150. Client systems 110, 120, and 130 generally represent any type or form of computing device or system, such as exemplary computing system 210 in FIG. 2. In one example, client system 110 may include modules 302 from FIG. 3.

Similarly, servers 140 and 145 generally represent computing devices or systems, such as application servers or database servers, configured to provide various database services and/or run certain software applications. Network 150 generally represents any telecommunication or computer network including, for example, an intranet, a wide area network (WAN), a local area network (LAN), a personal area network (PAN), or the Internet.

As illustrated in FIG. 1, one or more storage devices 160(1)-(N) may be directly attached to server 140. Similarly, one or more storage devices 170(1)-(N) may be directly attached to server 145. Storage devices 160(1)-(N) and storage devices 170(1)-(N) generally represent any type or form of storage device or medium capable of storing data and/or other computer-readable instructions. In certain embodiments, storage devices 160(1)-(N) and storage devices 170(1)-(N) may represent network-attached storage (NAS) devices configured to communicate with servers 140 and 145 using various protocols, such as NFS, SMB, or CIFS.

Servers 140 and 145 may also be connected to a storage area network (SAN) fabric 180. SAN fabric 180 generally represents any type or form of computer network or architecture capable of facilitating communication between a plurality of storage devices. SAN fabric 180 may facilitate communication between servers 140 and 145 and a plurality of storage devices 190(1)-(N) and/or an intelligent storage array 195. SAN fabric 180 may also facilitate, via network 150 and servers 140 and 145, communication between client systems 110, 120, and 130 and storage devices 190(1)-(N) and/or intelligent storage array 195 in such a manner that devices 190(1)-(N) and array 195 appear as locally attached devices to client systems 110, 120, and 130. As with storage devices 160(1)-(N) and storage devices 170(1)-(N), storage devices 190(1)-(N) and intelligent storage array 195 generally represent any type or form of storage device or medium capable of storing data and/or other computer-readable instructions.

In certain embodiments, and with reference to exemplary computing system 210 of FIG. 2, a communication interface, such as communication interface 222 in FIG. 2, may be used to provide connectivity between each client system 110, 120, and 130 and network 150. Client systems 110, 120, and 130 may be able to access information on server 140 or 145 using, for example, a web browser or other client software. Such software may allow client systems 110, 120, and 130 to access data hosted by server 140, server 145, storage devices 160(1)-(N), storage devices 170(1)-(N), storage devices 190(1)-(N), or intelligent storage array 195. Although FIG. 1 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 140, server 145, storage devices 160(1)-(N), storage devices 170(1)-(N), storage devices 190(1)-(N), intelligent storage array 195, or any combination thereof. All or a portion of one or more of the exemplary embodiments disclosed herein may also be encoded as a computer program, stored in server 140, run by server 145, and distributed to client systems 110, 120, and 130 over network 150. Accordingly, network architecture 100 may perform and/or be a means for performing, either alone or in combination with other elements, one or more of the identifying, tracking, creating, defragmenting, parsing, adding, and/or compacting steps disclosed herein. Network architecture 100 may also be used to perform and/or be a means for performing other steps and features set forth in the instant disclosure.

FIG. 2 is a block diagram of an exemplary computing system 210 capable of implementing one or more of the embodiments described and/or illustrated herein. Computing system 210 broadly represents any single or multi-processor computing device or system capable of executing computer-readable instructions. Examples of computing system 210 include, without limitation, workstations, laptops, client-side terminals, servers, distributed computing systems, handheld devices, or any other computing system or device. In its most basic configuration, computing system 210 may include at least one processor 214 and a system memory 216.

Processor 214 generally represents any type or form of processing unit capable of processing data or interpreting and executing instructions. In certain embodiments, processor 214 may receive instructions from a software application or module. These instructions may cause processor 214 to perform the functions of one or more of the exemplary embodiments described and/or illustrated herein. For example, processor 214 may perform and/or be a means for performing, either alone or in combination with other elements, one or more of the identifying, tracking, creating, defragmenting, parsing, adding, and/or compacting steps described herein. Processor 214 may also perform and/or be a means for performing any other steps, methods, or processes described and/or illustrated herein.

System memory 216 generally represents any type or form of volatile or non-volatile storage device or medium capable of storing data and/or other computer-readable instructions. Examples of system memory 216 include, without limitation, random access memory (RAM), read only memory (ROM), flash memory, or any other suitable memory device. Although not required, in certain embodiments computing system 210 may include both a volatile memory unit (such as, for example, system memory 216) and a non-volatile storage device (such as, for example, primary storage device 232, as described in detail below). In one example, one or more of modules 302 from FIG. 3 may be loaded into system memory 216.

In certain embodiments, exemplary computing system 210 may also include one or more components or elements in addition to processor 214 and system memory 216. For example, as illustrated in FIG. 2, computing system 210 may include a memory controller 218, an Input/Output (I/O) controller 220, and a communication interface 222, each of which may be interconnected via a communication infrastructure 212. Communication infrastructure 212 generally represents any type or form of infrastructure capable of facilitating communication between one or more components of a computing device. Examples of communication infrastructure 212 include, without limitation, a communication bus (such as an ISA, PCI, PCIe, or similar bus) and a network.

Memory controller 218 generally represents any type or form of device capable of handling memory or data or controlling communication between one or more components of computing system 210. For example, in certain embodiments memory controller 218 may control communication between processor 214, system memory 216, and I/O controller 220 via communication infrastructure 212. In certain embodiments, memory controller may perform and/or be a means for performing, either alone or in combination with other elements, one or more of the steps or features described and/or illustrated herein, such as identifying, tracking, creating, defragmenting, parsing, adding, and/or compacting.

I/O controller 220 generally represents any type or form of module capable of coordinating and/or controlling the input and output functions of a computing device. For example, in certain embodiments I/O controller 220 may control or facilitate transfer of data between one or more elements of computing system 210, such as processor 214, system memory 216, communication interface 222, display adapter 226, input interface 230, and storage interface 234. I/O controller 220 may be used, for example, to perform and/or be a means for performing, either alone or in combination with other elements, one or more of the identifying, tracking, creating, defragmenting, parsing, adding, and/or compacting steps described herein. I/O controller 220 may also be used to perform and/or be a means for performing other steps and features set forth in the instant disclosure.

Communication interface 222 broadly represents any type or form of communication device or adapter capable of facilitating communication between exemplary computing system 210 and one or more additional devices. For example, in certain embodiments communication interface 222 may facilitate communication between computing system 210 and a private or public network including additional computing systems. Examples of communication interface 222 include, without limitation, a wired network interface (such as a network interface card), a wireless network interface (such as a wireless network interface card), a modem, and any other suitable interface. In at least one embodiment, communication interface 222 may provide a direct connection to a remote server via a direct link to a network, such as the Internet. Communication interface 222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 222 may also represent a host adapter configured to facilitate communication between computing system 210 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 222 may also allow computing system 210 to engage in distributed or remote computing. For example, communication interface 222 may receive instructions from a remote device or send instructions to a remote device for execution. In certain embodiments, communication interface 222 may perform and/or be a means for performing, either alone or in combination with other elements, one or more of the identifying, tracking, creating, defragmenting, parsing, adding, and/or compacting steps disclosed herein. Communication interface 222 may also be used to perform and/or be a means for performing other steps and features set forth in the instant disclosure.

As illustrated in FIG. 2, computing system 210 may also include at least one display device 224 coupled to communication infrastructure 212 via a display adapter 226. Display device 224 generally represents any type or form of device capable of visually displaying information forwarded by display adapter 226. Similarly, display adapter 226 generally represents any type or form of device configured to forward graphics, text, and other data from communication infrastructure 212 (or from a frame buffer, as known in the art) for display on display device 224.

As illustrated in FIG. 2, exemplary computing system 210 may also include at least one input device 228 coupled to communication infrastructure 212 via an input interface 230. Input device 228 generally represents any type or form of input device capable of providing input, either computer or human generated, to exemplary computing system 210. Examples of input device 228 include, without limitation, a keyboard, a pointing device, a speech recognition device, or any other input device. In at least one embodiment, input device 228 may perform and/or be a means for performing, either alone or in combination with other elements, one or more of the identifying, tracking, creating, defragmenting, parsing, adding, and/or compacting steps disclosed herein. Input device 228 may also be used to perform and/or be a means for performing other steps and features set forth in the instant disclosure.

As illustrated in FIG. 2, exemplary computing system 210 may also include a primary storage device 232 and a backup storage device 233 coupled to communication infrastructure 212 via a storage interface 234. Storage devices 232 and 233 generally represent any type or form of storage device or medium capable of storing data and/or other computer-readable instructions. For example, storage devices 232 and 233 may be a magnetic disk drive (e.g., a so-called hard drive), a floppy disk drive, a magnetic tape drive, an optical disk drive, a flash drive, or the like. Storage interface 234 generally represents any type or form of interface or device for transferring data between storage devices 232 and 233 and other components of computing system 210. In one example, a list of changed files 320 from FIG. 3 may be stored in primary storage device 232.

In certain embodiments, storage devices 232 and 233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 232 and 233 may also include other similar structures or devices for allowing computer software, data, or other computer-readable instructions to be loaded into computing system 210. For example, storage devices 232 and 233 may be configured to read and write software, data, or other computer-readable information. Storage devices 232 and 233 may also be a part of computing system 210 or may be a separate device accessed through other interface systems.

In certain embodiments, storage devices 232 and 233 may be used, for example, to perform and/or be a means for performing, either alone or in combination with other elements, one or more of the identifying, tracking, creating, defragmenting, parsing, adding, and/or compacting steps disclosed herein. Storage devices 232 and 233 may also be used to perform and/or be a means for performing other steps and features set forth in the instant disclosure.

Many other devices or subsystems may be connected to computing system 210. Conversely, all of the components and devices illustrated in FIG. 2 need not be present to practice the embodiments described and/or illustrated herein. The devices and subsystems referenced above may also be interconnected in different ways from that shown in FIG. 2. Computing system 210 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 210. All or a portion of the computer program stored on the computer-readable medium may then be stored in system memory 216 and/or various portions of storage devices 232 and 233. When executed by processor 214, a computer program loaded into computing system 210 may cause processor 214 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 210 may be configured as an application specific integrated circuit (ASIC) adapted to implement one or more of the exemplary embodiments disclosed herein.

As detailed above, one or more components of network architecture 100 and/or computing system 210 may perform and/or be a means for performing, either alone or in combination with other elements, one or more steps of an exemplary method for selective defragmentation, as will be explained in greater detail below.

Figure 3:
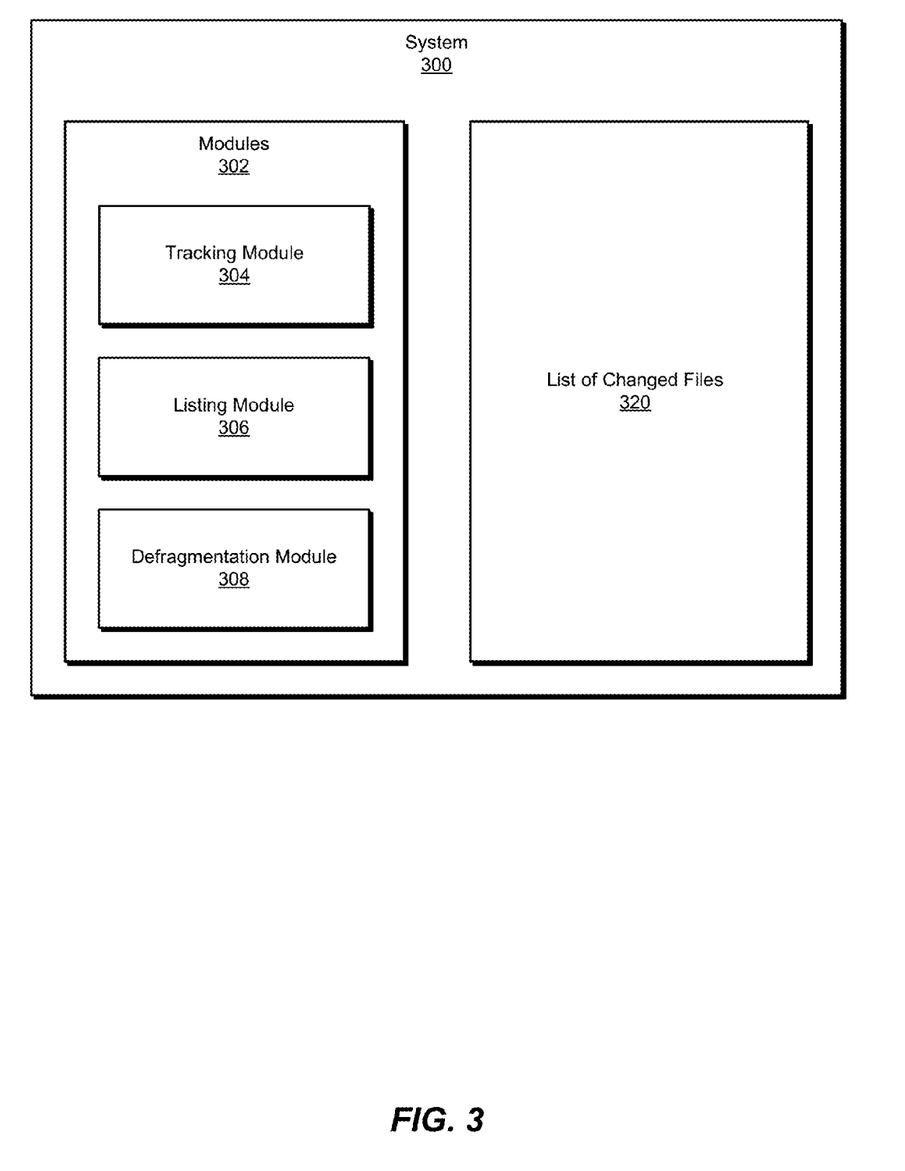
FIG. 3 is a block diagram of an exemplary system for selective defragmentation.

FIG. 3 is a block diagram of an exemplary system 300 for selective defragmentation. As illustrated in this figure, exemplary system 300 may include one or more modules 302 for performing one or more tasks. For example, and as will be explained in greater detail below, exemplary system 300 may include a tracking module 304 programmed to identify a file system and track changes to files in the file system. Exemplary system 300 may also include a listing module 306 programmed to create a list of changed files (e.g., list of changed files 320).

In addition, and as will be described in greater detail below, exemplary system 300 may include a defragmentation module 308 programmed to selectively defragment files in the list of changed files. Although illustrated as separate elements, one or more of modules 302 in FIG. 3 may represent portions of a single module or application.

In certain embodiments, one or more of modules 302 in FIG. 3 may represent one or more software applications or programs that, when executed by a computing device, may cause the computing device to perform one or more tasks. For example, as will be described in greater detail below, one or more of modules 302 may represent software modules stored and configured to run on one or more computing devices, such as computing device 402 illustrated in FIG. 4, computing system 210 in FIG. 2, and/or portions of exemplary network architecture 100 in FIG. 1. One or more of modules 302 in FIG. 3 may also represent all or portions of one or more special-purpose computers configured to perform one or more tasks.

Exemplary system 300 in FIG. 3 may be deployed in a variety of ways. For example, all or a portion of exemplary system 300 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 4:
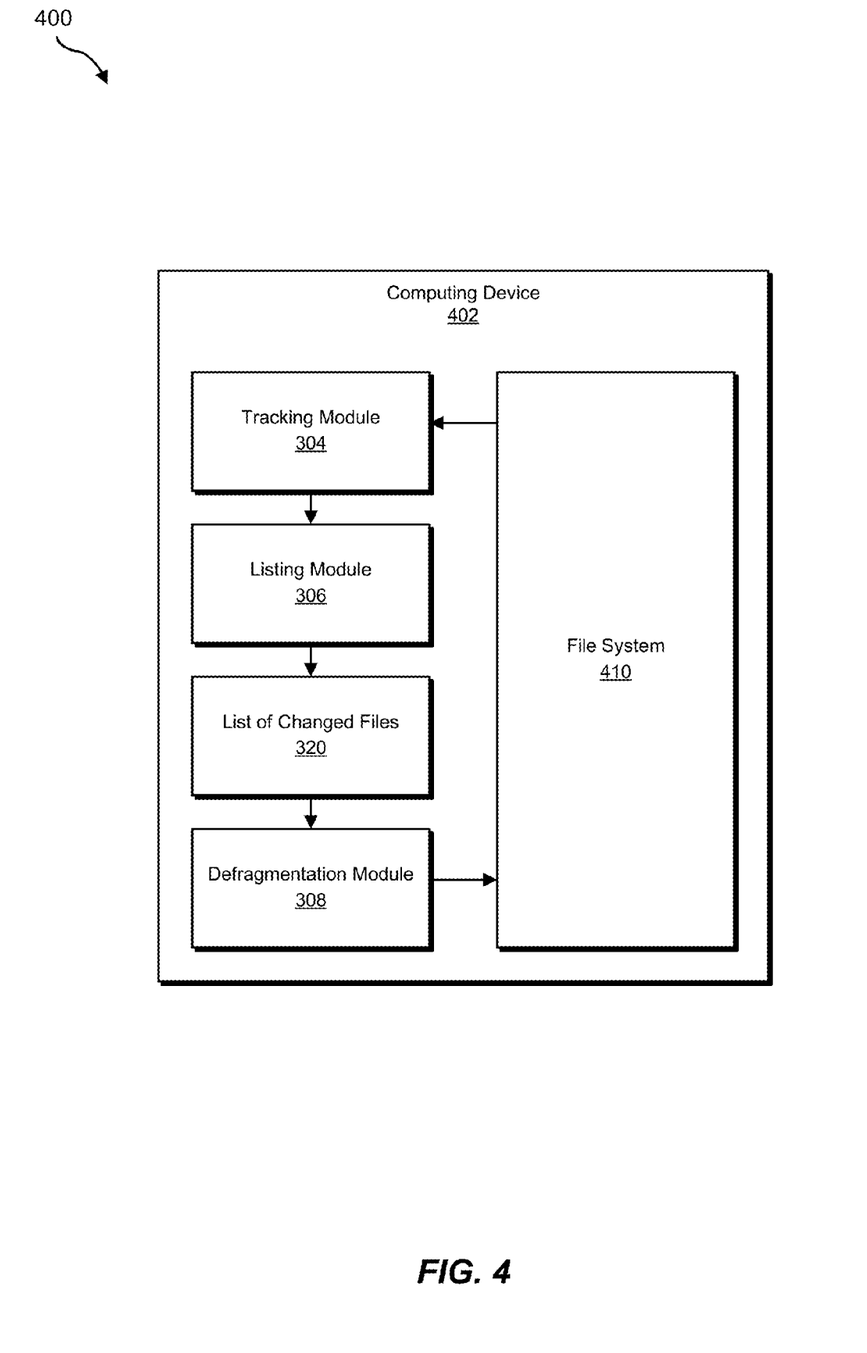
FIG. 4 is a block diagram of an exemplary system for selective defragmentation.

In another example, all or a portion of exemplary system 300 may represent portions of exemplary system 400 illustrated in FIG. 4. As illustrated in FIG. 4, exemplary system 400 may include a computing device 402 with a file system 410. In one embodiment, and as will be described in greater detail below, computing device 402 may be programmed to selectively defragment files in file system 410.

For example, computing device 402 may be programmed with tracking module 304, listing module 306, and defragmentation module 308 from FIG. 3. In this example, and as will be explained in greater detail below, tracking module 304 may identify a file system (such as file system 410) and track changes to files in the file system. Listing module 306 may then create a list of changed files (e.g., list of changed files 320) based, at least in part, on the changes to files tracked by tracking module 304. Defragmentation module 308 may then selectively defragment file system 410 by defragmenting files in the list of changed files.

Computing device 402 generally represents any type or form of computing device capable of reading computer-executable instructions. Examples of computing device 402 include, without limitation, laptops, desktops, servers, cellular phones, personal digital assistants (PDAs), multimedia players, embedded systems, combinations of one or more of the same, exemplary computing system 210 in FIG. 2, or any other suitable computing device.

As will be explained below, by tracking which files in a file system have changed, the systems and methods described herein may identify and defragment only those files that may be fragmented, potentially saving time for an end-user as well as computing resources while ensuring that most or all fragmented files in the file system are defragmented. In addition, and as will be discussed below, some embodiments described herein may further conserve time and computing resources by tracking other indicia of file-system activity and selectively defragmenting files based on such information.

Figure 5:
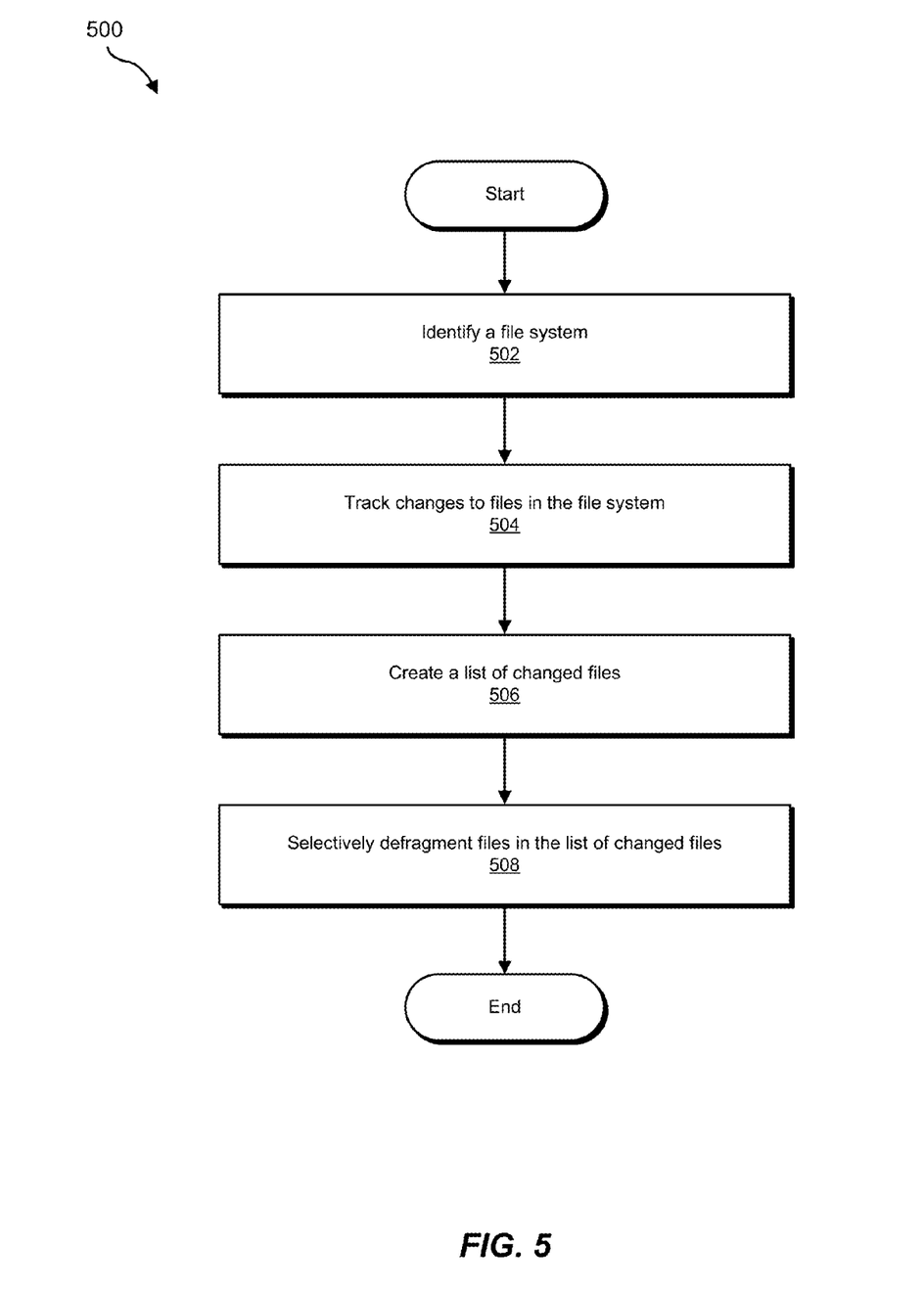
FIG. 5 is a flow diagram of an exemplary method for selective defragmentation.

FIG. 5 is a flow diagram of an exemplary computer-implemented method 500 for selective defragmentation. The steps shown in FIG. 5 may be performed by any suitable computer-executable code and/or computing system. In some embodiments, the steps shown in FIG. 5 may be performed by one or more of the components of system 300 in FIG. 3 and/or system 400 in FIG. 4.

For example, at step 502 tracking module 304 may, as part of computing system 402, identify a file system (such as file system 410 of FIG. 4). Tracking module 304 may perform step 502 in a variety of ways. In one example, tracking module 304 may identify the file system by querying an operating system. In another example, tracking module 304 may identify the file system by reading a configuration file. In some examples, tracking module 304 may identify the file system by interfacing with the file system.

As used herein, the phrase "file system" may refer to any system for storing and/or organizing data files. For example, file system 410 of FIG. 4 may include VERITAS FILE SYSTEM, NTFS, EXT3, FAT, and/or any other suitable file system. In addition, a "file system" may refer to any system whose contents may be defragmented.

At step 504, tracking module 304 may track changes to files in the file system. Tracking module 304 may track changes to files in the file system in a variety of contexts. For example, tracking module 304 may include all or a portion of a file system driver and/or a file system filter, and may accordingly observe any change made to a file in the file system via the file system driver. Additionally or alternatively, tracking module 304 may track changes to files in the file system by operating outside of a virtual machine and inspecting the activities of a virtualized file system driver and/or intercepting input/output communications from the virtual machine. Generally, tracking module 304 may track changes to files in the file system using any means or method that allows tracking module 304 to identify files that have changed.

Tracking module 304 may track a variety of file changes. For example, tracking module 304 may track file modifications, file creations, directory modifications, directory creations, file deletions, directory deletions, file movements, and/or directory movements (including, for example, movement of a file or directory from one volume to another in a multi-volume file system). In some examples, tracking module 304 may specifically track file modifications that alter the length of a file. Additionally or alternatively, tracking module 304 may track file modifications that may rearrange the file on a storage device. Generally, tracking module 304 may track any change to a file that may prove relevant to the defragmentation of the file or any other file.

Figure 7:
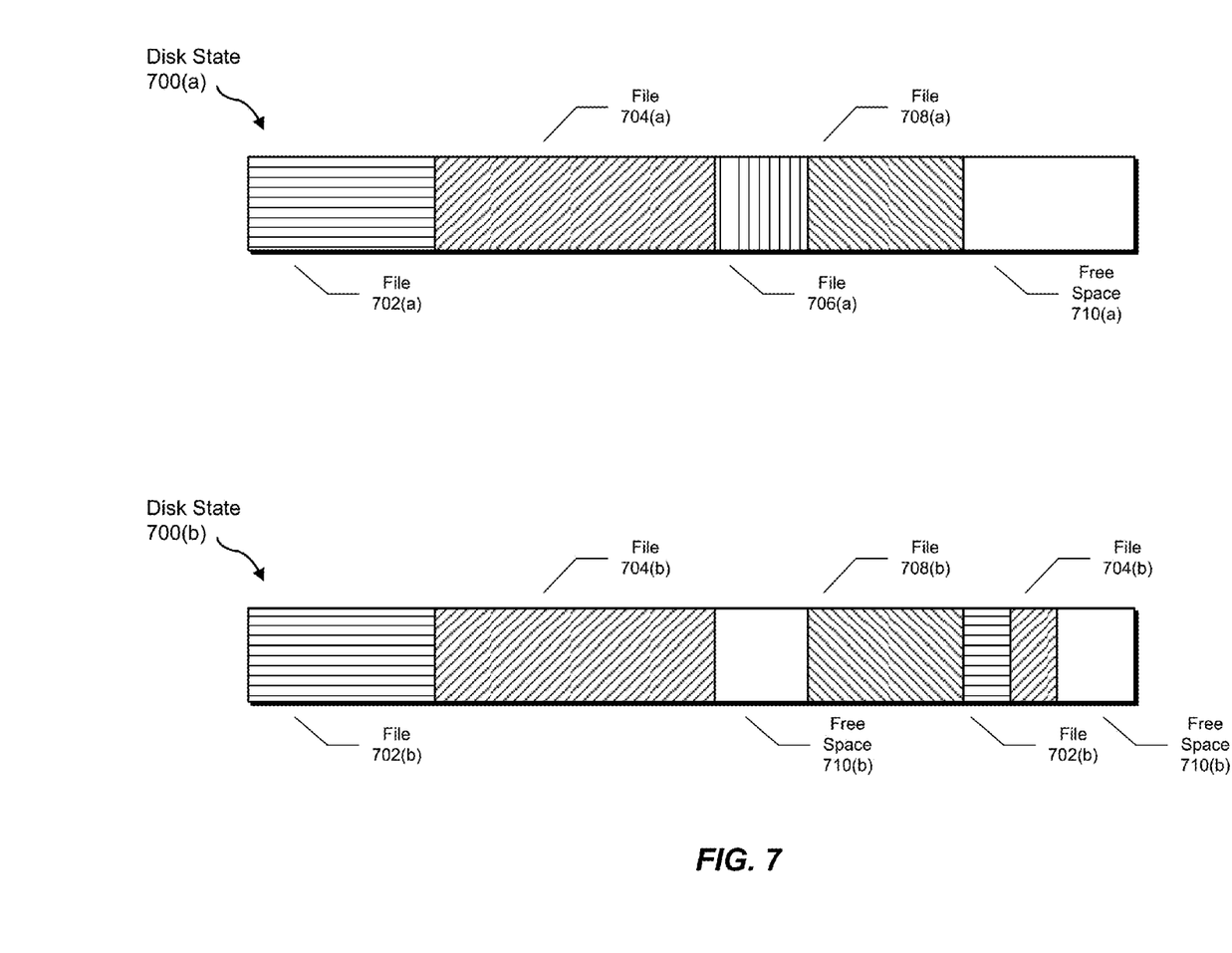
FIG. 7 is a diagram of two exemplary disk states illustrating exemplary file changes.

For example, for illustrative purposes only, FIG. 7 shows exemplary disk states 700(a) and 700(b). Disk state 700(a) shows a fully defragmented disk, with a file 702(a), a file 704(a), a file 706(a), and a file 708(a), and free space 710(a). In this illustrative example, an application may append data to file 702(a), resulting in a file 702(b). Another application may append data to file 704(a), resulting in a file 704(b). Another application may then delete file 706(a), extending free space 710(a) to free space 710(b). The above file changes may result in the fragmentation of files 702(b) and 704(b) and leave free space 710(b) fragmented as well. In this example, tracking module 304 may track the changes to files 702(a), 704(a), and/or 706(a).

In some examples, tracking module 304 may track changes to files in the file system over a predetermined period of time. For example, tracking module 304 may track files changed over a fixed time period (e.g., 48 hours). Additionally or alternatively, tracking module 304 may track files changed since the last defragmentation operation. Generally, tracking module 304 may use any suitable predetermined period of time to track changes to files in the file system.

Returning to FIG. 5, at step 506 listing module 306 may create a list of changed files. Listing module 306 may perform this task in any number of ways. For example, listing module 306 may create a list of changed files by writing the list of changed files to a log file, by adding the names of the changed files to a database, and/or by storing each changed file in a data structure in memory. As used herein, a "list" may refer to any collection of data and/or data structure.

In some examples, listing module 306 may create the list of changed files as part of a file-system implementation. For example, listing module 306 may include all or part of a journaling system. Additionally or alternatively, listing module 306 may create the list of changed files by creating a file change log, such as the file change log implemented by VERITAS FILE SYSTEM. As used herein, a "file change log" may include any log, file, and/or data collection including changes to files in the file system.

Additionally or alternatively, listing module 306 may create the list of changed files by identifying a file change log, parsing the file change log for filenames of changed files, and adding the filenames to the list. In other words, the list of changed files may include: 1) a list of files created by the file system and/or operating system (such as the file change log implemented by VERITAS FILE SYSTEM) and/or 2) a list of files based on another list of files (created, e.g., by parsing the file change log implemented by VERITAS FILE SYSTEM to create the list of changed files).

In some examples, the list of changed files may include a list of fully qualified filenames (e.g., filenames with full path information). Generally, a "fully qualified filename" may include any information allowing an application (such as a defragmentation program) to uniquely identify a file to which the filename corresponds.

Returning to FIG. 5, at step 508 defragmentation module 308 may selectively defragment files in the list of changed files. As used herein, the term "defragmentation" may refer to any procedure designed to organize related blocks of data on a storage system and/or device in order to improve the performance of the storage system and/or device. Likewise, the phrase "selective defragmentation" may refer to any defragmentation procedure designed to defragment a file system based on a particular set of files and/or information relating to the set of files.

For example, defragmentation module 308 may defragment only those files in the list of changed files. Additionally or alternatively, defragmentation module 308 may defragment files in the list of changed files as well as moving, consolidating, and/or defragmenting other files in order to efficiently pack, fit, and/or organize files in the file system. In some examples, defragmentation module 308 may move other files and/or portions of other files (by, e.g., arranging files in the same directory to be adjacent to one another on the storage device).

In some examples, defragmentation module 308 may defragment files in the list of changed files by compacting free space in the file system based on the list of changed files. For example, in FIG. 7, the deletion of file 706(a) in disk state 700(a) may leave free space 710(b) in disk state 700(b) fragmented. In this example, defragmentation module 308 may identify file 706(a) as a changed file and, accordingly, compact (i.e., defragment) free space 710(b).

Defragmentation module 308 may also fully defragment the file system before selectively defragmenting the file system. For example, defragmentation module 308 may fully defragment the file system once and then start tracking file changes and periodically selectively defragmenting the file system. In another example, defragmentation module 308 may fully defragment the file system periodically in case one or more of modules 302 fails to track, list, and/or defragment a file.

Upon completion of step 508, exemplary method 500 in FIG. 5 may terminate.

Figure 6:
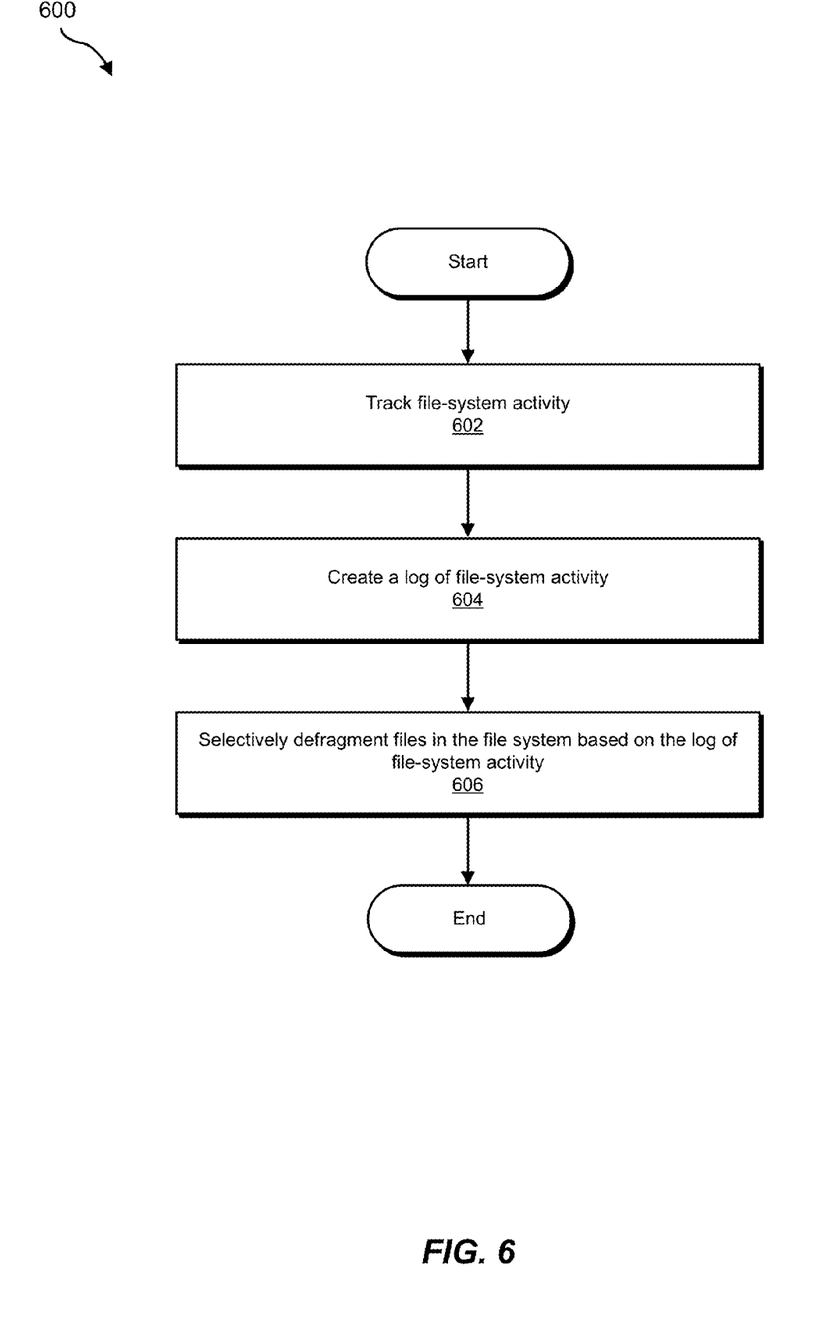
FIG. 6 is a flow diagram of an exemplary method for selective defragmentation.

FIG. 6 is a flow diagram of an exemplary computer-implemented method 600 for selective defragmentation. The steps shown in FIG. 6 may be performed by any suitable computer-executable code and/or computing system. In some embodiments, the steps shown in FIG. 6 may be performed by one or more of the components of system 300 in FIG. 3 and/or system 400 in FIG. 4.

For example, at step 602 tracking module 304 may, as part of computing system 402, track file-system activity. Generally, tracking module 304 may track file-system activity in a variety of contexts. For example, tracking module 304 may track file-system activity in the same manner described above in reference to step 504 of FIG. 5.

Tracking module 304 may track a variety of file-system activity. For example, tracking module 304 may track input/output statistics of a file (e.g., how often the file is read from, how often the file is written to, etc.), openings of the file, and/or any other access of the file. Generally, tracking module 304 may track any file-system activity helpful for indicating which files in the file system to defragment and/or how aggressively to defragment the files.

At step 604, listing module 306 may create a log of file-system activity. Listing module 306 may create the log of file-system activity in any suitable manner. For example, listing module 306 may create the log of file-system activity using any of the methods described above in reference to step 506 of FIG. 5.

At step 606, defragmentation module 308 may selectively defragment files in the file system based on the log of file-system activity. For example, defragmentation module 308 may defragment any files that were opened within a predetermined period of time.

Additionally or alternatively, defragmentation module 308 may aggressively defragment files with a high level of file-system activity. As used herein, the phrase "aggressive defragmentation" may refer to any defragmentation procedure that takes more time, uses more computing resources, and/or makes a more sophisticated determination about which files to defragment and/or how to arrange files on a storage device. For example, defragmentation module 308 may, in the course of defragmentation, place a file that is frequently read from in a location on a storage device and/or system that provides a faster read access. Additionally or alternatively, defragmentation module 308 may, in the course of defragmentation, group files that tend to be accessed one after another adjacent to each other on a storage device. Generally, defragmentation module 308 may aggressively defragment files with a high level of file-system activity in any way that tends to improve the performance of a storage device on which the files are stored.

Upon completion of step 606, exemplary method 600 in FIG. 6 may terminate.

As detailed above, by tracking which files in a file system have changed, the systems and methods described herein may identify and defragment only those files that may be fragmented, potentially saving time for an end-user as well as computing resources while ensuring that most or all fragmented files in the file system are defragmented. In addition, various embodiments described herein may further conserve time and computing resources by tracking other indicia of file-system activity and selectively defragmenting files based on such information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a less efficient storage device into a more efficient storage device by defragmenting files and/or compacting free space on the storage device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for selective defragmentation, at least a portion of the method being performed by a computing device comprising at least one processor, the method comprising:
   identifying a file system comprising a plurality of files;
   fully defragmenting the file system;
   after determining that the file system has been fully defragmented, tracking changes to files within the file system that occurred after the file system was fully defragmented and that have the potential for causing fragmentation within the file system;
   creating, based at least in part on the tracked changes, a list of changed files, wherein the list of changed files identifies only files that changed after the file system was fully defragmented and that have the potential for causing fragmentation within the file system;
   after creating the list of changed files,
   selectively defragmenting the file system by detecting fragmentation in the changed files and only defragmenting the changed files identified in the list of changed files based on the list of changed files.

2. The computer-implemented method of claim 1, wherein tracking changes to files within the file system comprises tracking changes to files within the file system over a predetermined interval of time.

3. The computer-implemented method of claim 1, wherein tracking changes to files within the file system comprises at least one of:
   tracking modification of a file;
   tracking creation of a file;
   tracking modification of a directory;
   tracking creation of a directory;
   tracking movement of a file or directory from one volume to another in a multi-volume file system.

4. The computer-implemented method of claim 1, wherein creating the list of changed files comprises:
   identifying a file change log, the file change log identifying changes to files in the file system;
   parsing the file change log for at least one filename of a changed file that changed after the file system was fully defragmented and that has the potential for causing fragmentation within the file system;
   adding the at least one filename to the list of changed files.

5. The computer-implemented method of claim 1, wherein tracking changes to files within the file system that occurred after the file system was fully defragmented and that have the potential for causing fragmentation within the file system comprises identifying, using a file-system driver, only those changes to files within the file system that occurred after the file system was fully defragmented and that have the potential for causing fragmentation within the file system.

6. The computer-implemented method of claim 1, wherein selectively defragmenting the file system further comprises compacting free space in the file system based on the list of changed files.

7. The computer-implemented method of claim 1, further comprising:
   tracking file-system activity;
   creating a log of file-system activity;
   selectively defragmenting the file system based on the log of file-system activity.

8. The computer-implemented method of claim 7, wherein tracking file-system activity comprises at least one of:
   tracking input/output statistics of a file;
   tracking opening of a file;
   tracking access of a file.

9. The computer-implemented method of claim 7, wherein selectively defragmenting the file system based on the log of file-system activity comprises aggressively defragmenting files with a high level of file-system activity.

10. A system for selective defragmentation, the system comprising:
    a tracking module programmed to identify a file system comprising a plurality of files;
    a defragmentation module programmed to fully defragment the file system;
    wherein the tracking module is further programmed to track, after determining that the file system has been fully defragmented, changes to files within the file system that occurred after the file system was fully defragmented and that have the potential for causing fragmentation within the file system;
    a listing module programmed to create, based at least in part on the tracked changes, a list of changed files, wherein the list of changed files identifies only files that changed after the file system was fully defragmented and that have the potential for causing fragmentation within the file system;
    wherein the defragmentation module is further programmed to, after creating the list of changed files, selectively defragment the file system by detecting fragmentation in the changed files and only defragmenting the changed files identified in the list of changed files based on the list of changed files;
    at least one processor configured to execute the tracking module, the listing module, and the defragmentation module.

11. The system of claim 10, wherein the tracking module tracks changes to files within the file system by tracking changes to files within the file system over a predetermined interval of time.

12. The system of claim 10, wherein the tracking module tracks changes to files within the file system by at least one of:
    tracking modification of a file;
    tracking creation of a file;
    tracking modification of a directory;
    tracking creation of a directory;
    tracking movement of a file or directory from one volume to another in a multi-volume file system.

13. The system of claim 10, wherein the listing module creates the list of changed files by:
    identifying a file change log, the file change log identifying changes to files in the file system;

parsing the file change log for at least one filename of a changed file that changed after the file system was fully defragmented and that has the potential for causing fragmentation within the file system;

adding the at least one filename to the list of changed files.

14. The system of claim 10, wherein the tracking module tracks changes to files within the file system that occurred after the file system was fully defragmented and that have the potential for causing fragmentation within the file system by identifying, using a file-system driver, only those changes to files within the file system that occurred after the file system was fully defragmented and that have the potential for causing fragmentation within the file system.

15. The system of claim 10, wherein the defragmentation module selectively defragments the file system by compacting free space in the file system based on the list of changed files.

16. The system of claim 10, wherein:

the tracking module is further programmed to track file-system activity;

the listing module is further programmed to create a log of file-system activity;

the defragmentation module is further programmed to selectively defragment files within the file system based on the log of file-system activity.

17. The system of claim 16, wherein the tracking module is programmed to track file-system activity by at least one of:

tracking input/output statistics of a file;

tracking opening of a file;

tracking access of a file.

18. A non-transitory computer-readable-storage medium comprising one or more computer-executable instructions that, when executed by at least one processor of a computing device, cause the computing device to:

identify a file system comprising a plurality of files;

fully defragment the file system;

after determining that the file system has been fully defragmented, track changes to files within the file system that occurred after the file system was fully defragmented and that have the potential for causing fragmentation within the file system;

create, based at least in part on the tracked changes, a list of changed files, wherein the list of changed files identifies only files that changed after the file system was fully defragmented and that have the potential for causing fragmentation within the file system;

after creating the list of changed files, selectively defragment the file system by detecting fragmentation in the changed files and only defragmenting the changed files identified in the list of changed files based on the list of changed files.

* * * * *